UNITED STATES PATENT OFFICE.

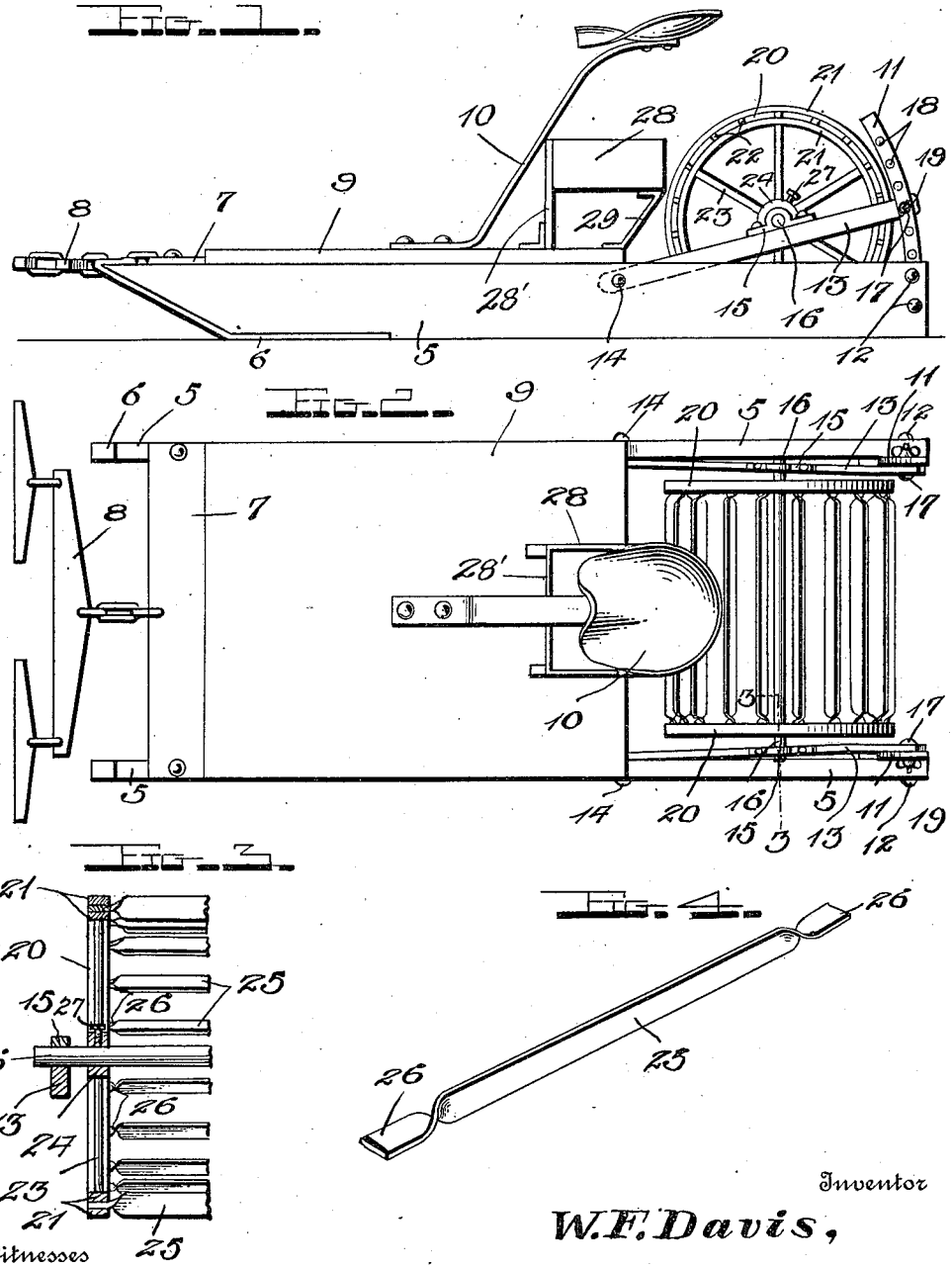

WILLIAM F. DAVIS, OF VAN VLEET, MISSISSIPPI.

STALK-CUTTER.

1,046,564.

Specification of Letters Patent.

Patented Dec. 10, 1912.

Application filed June 10, 1912. Serial No. 702,910.

*To all whom it may concern:*

Be it known that I, WILLIAM F. DAVIS, a citizen of the United States, residing at Van Vleet, in the county of Chickasaw and State of Mississippi, have invented certain new and useful Improvements in Stalk-Cutters, of which the following is a specification, reference being had to the accompanying drawings.

This invention relates to improvements in stalk cutters and has for its object to provide a cutting drum consisting of a plurality of double edged cutting knives, and means for mounting the drum in the frame of the machine whereby the same may be adjusted with relation to the ground surface.

Another object of the invention is to provide a device for the above purpose which is extremely simple in construction, strong, durable and efficient in use and may be manufactured at comparatively small cost.

With the above and other objects in view as will become apparent as the description proceeds, the invention consists in certain constructions, combinations and arrangements of the parts that I shall hereinafter fully describe and claim.

For a full understanding of the invention reference is to be had to the following description and accompanying drawing, in which—

Figure 1 is a side elevation of a stalk cutter embodying the present invention; Fig. 2 is a top plan view thereof; Fig. 3 is an enlarged section taken on the line 3—3 of Fig. 2; and Fig. 4 is a detail perspective view of one of the stalk cutting blades.

Corresponding and like parts are referred to in the following description and designated in the accompanying drawing by like reference characters.

Referring in detail to the drawing, 5 designates the parallel longitudinal runners which are provided upon their forward lower edges with wear plates 6 which serve to prevent the runners being unduly worn or broken by contact with the rocks or other obstructions in the path of movement of the machine. These runners are connected at their forward ends by cross bars 7 to which the usual draft attachments 8 are connected. At a point intermediate of the ends of the runners the same are also connected by means of the platform 9 upon which the driver's seat 10 is mounted. To the rear ends of the runners 5 the upwardly and forwardly inclined bars 11 are rigidly secured at their lower ends by means of the bolts 12. Bars 13 are pivotally mounted at their lower ends as at 14 upon the inner sides of the runners 5 and carry suitable bearings 15 to receive the ends of the transverse shaft 16. The other ends of said shaft carrying bars are adapted to be adjustably connected to the forwardly inclined bars 11 by means of the bolts 17 which are adapted to be disposed through any one of a series of openings 18 provided in the bars 11. Suitable clamping nuts 19 are threaded upon the ends of the bolts 17 whereby the shaft carrying bars may be rigidly clamped in their adjusted positions. Upon the transverse shaft 16 adjacent to each end thereof the heads 20 are adjustably mounted. These heads, each of which is cast in one piece consists of the rim 21 provided with the spaced slots 22. The rims 21 are connected by means of the spokes 23 to the central hubs 24. These hubs are provided with set screws 27 whereby the heads may be rigidly and securely held in their adjusted positions upon opposite ends of the shaft 16. Cutting blades 25, preferably of the double-edged type have their ends twisted as at 26 to dispose the same in a plane at right angles to the intermediate body portion of the plate. These twisted ends of the cutting blades are adapted to be arranged in the slots 22 of the head rims 21.

In mounting the cutting blades, the heads are first loosened upon the shaft 16 and after the ends of the blades 25 have been positioned in the slots 22, said heads moved inwardly upon the shaft and rigidly fixed thereon by means of the set screws 27. The blades may be arranged between the heads in parallel relation to the shaft 16 or disposed at an angle with relation thereto by simply turning one of the heads upon said shaft. In this manner a shearing cut of the blades from end to end thereof may be obtained in the movement of the machine over the field. It will be obvious that any desired number of cutting blades may be provided and that by mounting the same in the heads as above described, any one of the blades may be easily and quickly removed when the same becomes broken and replaced by another.

Upon the platform 9 beneath the operator's seat a weight receiving box 28 is mounted. The front wall 28' of this box extends downwardly and is securely fastened at its lower end to the platform. The rear wall of said weight box is disposed adjacent to the cutting blades 25 and is braced by means of the inclined bars 29. The front wall 28' will prevent earth and rubbish being thrown by the blades 25 upon the platform. Under ordinary circumstances, the rear ends of the runners will be held in close engagement with the ground when the cutting blades strike the stalks by the weight of the operator, but in some instances it may be found necessary to apply additional weight and it is for this purpose that the box 28 is provided.

From the foregoing description in connection with the accompanying drawing, it is believed that the construction and manner of operation of my improved stalk cutter will be clearly understood.

The machine consists of comparatively few elements and may be therefore manufactured at small cost. It is also very efficient and extremely strong and durable in practical use.

While I have shown and described the preferred construction and arrangement of the various elements, it will be understood that the same are susceptable of considerable modification without departing from the essential features or sacrificing any of the advantages thereof.

Having thus described the invention what is claimed is:

1. In a stalk cutter, spaced heads each consisting of radial spokes and spaced concentric rims on the outer ends of the spokes, a plurality of cutting blades having their ends twisted to dispose the same in a plane at right angles to the intermediate portions of the blades, said twisted ends of the blades being adapted for arrangement between the spaced rims of the heads, and means for adjusting the heads to angularly dispose said blades between the same.

2. In a stalk cutter, the combination of a shaft, heads longitudinally and rotatably adjustable upon said shaft, said heads being provided with spaced slots adjacent to their peripheries, stalk cutting blades having their ends twisted and adapted to be disposed in the slots of said heads, and means for rigidly securing the heads at their adjusted positions whereby the blades arranged between said heads may be angularly disposed with relation to said shaft.

3. In a stalk cutter, a shaft, spaced heads loosely mounted upon said shaft and each consisting of a rim, a hub and spokes connecting the rim and hub, said rim being provided with a plurality of spaced slots, cutting blades arranged between said heads and having their ends loosely disposed in said slots, said heads being adapted for independent adjustment upon the shaft to dispose the blades between the same at an angle to the shaft, and means for rigidly securing said heads upon said shaft to maintain said heads in such angular positions.

In testimony whereof I hereunto affix my signature in the presence of two witnesses.

WILLIAM F. DAVIS.

Witnesses:
C. F. WILSON,
M. R. WILSON.

Copies of this patent may be obtained for five cents each, by addressing the "Commissioner of Patents. Washington, D. C."